United States Patent
Canova, Jr. et al.

(10) Patent No.: US 7,324,072 B1
(45) Date of Patent: Jan. 29, 2008

(54) PIXEL BORDER FOR IMPROVED VIEWABILITY OF A DISPLAY DEVICE

(75) Inventors: Francis James Canova, Jr., Fremont, CA (US); Katherine Noesen, San Francisco, CA (US); Richard Blair, Morgan Hill, CA (US)

(73) Assignee: Palm, Inc., Sunnyvale, CA (US)

( * ) Notice: Subject to any disclaimer, the term of this patent is extended or adjusted under 35 U.S.C. 154(b) by 34 days.

(21) Appl. No.: 11/243,037

(22) Filed: Oct. 3, 2005

Related U.S. Application Data

(63) Continuation of application No. 09/709,142, filed on Nov. 8, 2000, now Pat. No. 6,961,029.

(51) Int. Cl.
*G09G 3/20* (2006.01)

(52) U.S. Cl. .................. 345/55; 345/87; 345/92; 348/245; 349/44

(58) Field of Classification Search ............. 348/245
See application file for complete search history.

(56) References Cited

U.S. PATENT DOCUMENTS

| | | | | |
|---|---|---|---|---|
| 4,620,289 | A | 10/1986 | Chauvel | 364/521 |
| 4,731,742 | A | 3/1988 | Nishi et al. | 364/521 |
| 4,814,756 | A | 3/1989 | Chauvel | 340/750 |
| 4,824,212 | A | 4/1989 | Taniguchi | 350/333 |
| 5,038,297 | A | 8/1991 | Hannah | 364/518 |
| 5,086,295 | A | 2/1992 | Boettcher et al. | 340/701 |
| 5,355,443 | A | 10/1994 | Kim et al. | 395/131 |
| 5,513,028 | A * | 4/1996 | Sono et al. | 349/139 |
| 5,559,529 | A | 9/1996 | Maher | 345/136 |
| 5,657,043 | A | 8/1997 | Fukui et al. | 345/100 |
| 5,719,648 | A * | 2/1998 | Yoshii et al. | 349/42 |
| 5,754,186 | A | 5/1998 | Tam et al. | 345/435 |
| 5,784,132 | A * | 7/1998 | Hashimoto | 349/44 |
| 5,805,149 | A | 9/1998 | Yuki et al. | 345/202 |
| 5,825,343 | A | 10/1998 | Moon | 345/94 |
| 5,838,334 | A | 11/1998 | Dye | 345/503 |
| 5,844,539 | A | 12/1998 | Kitagawa | 345/100 |
| 6,018,331 | A | 1/2000 | Ogwa et al. | 345/99 |
| 6,064,359 | A | 5/2000 | Lin et al. | 345/89 |
| 6,100,858 | A | 8/2000 | Tran | 345/59 |
| 6,140,992 | A | 10/2000 | Matsuzaki et al. | 345/98 |
| 6,181,313 | B1 | 1/2001 | Yokota et al. | 345/100 |
| 6,195,078 | B1 | 2/2001 | Dinwiddie et al. | 345/114 |
| 6,204,895 | B1 * | 3/2001 | Nakamura et al. | 349/5 |
| 6,288,704 | B1 | 9/2001 | Flack et al. | 345/158 |
| 6,323,834 | B1 | 11/2001 | Colgan et al. | 345/84 |

(Continued)

FOREIGN PATENT DOCUMENTS

EP  0283235  9/1988  ............ 1/133

(Continued)

*Primary Examiner*—Kee M. Tung
*Assistant Examiner*—Antonio A Caschera

(57) ABSTRACT

A display device having a display matrix including a pixel border of width x and located around the edge locations of the matrix for improved viewability. The pixels of the border are "dummy pixels" each containing a red, a green and a blue subpixel. Each subpixel has a color filter and is manufactured with a "dummy" transistor which operates to fix open the subpixels thereby allowing a predetermined amount of "white" color brightness through the dummy pixels. The pixel border is useful for increasing viewability of characters that are displayed along the edge of the LCD matrix area in which images are generated from a frame buffer memory.

17 Claims, 15 Drawing Sheets

U.S. PATENT DOCUMENTS

| | | | |
|---|---|---|---|
| 6,323,849 B1 | 11/2001 | He et al. | 345/204 |
| 6,476,821 B2 | 11/2002 | Sawada et al. | 345/620 |
| 6,535,188 B1 | 3/2003 | Morimoto | 345/87 |
| 6,577,291 B2 * | 6/2003 | Hill et al. | 345/89 |
| 6,590,592 B1 | 7/2003 | Nason et al. | 345/778 |
| 6,597,373 B1 | 7/2003 | Singla et al. | 345/698 |
| 6,831,662 B1 | 12/2004 | Lum et al. | 345/698 |
| 6,961,029 B1 * | 11/2005 | Canova et al. | 345/55 |

FOREIGN PATENT DOCUMENTS

| | | | |
|---|---|---|---|
| EP | 0394814 | 10/1990 | |
| GB | 2214342 | 9/1998 | 1/133 |

* cited by examiner

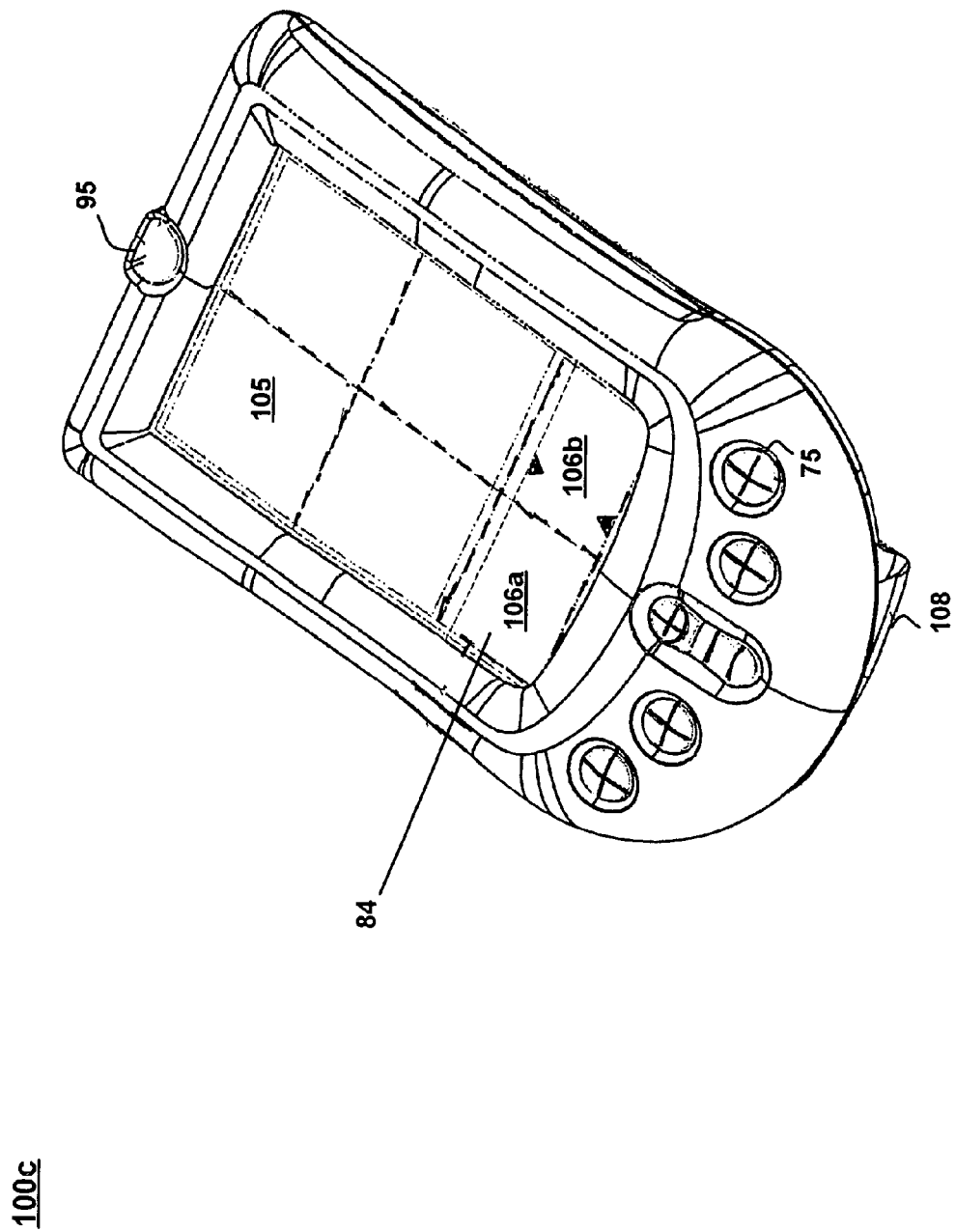

105

312i

314i

PIXEL BORDER FOR IMPROVED VIEWABILITY OF A DISPLAY DEVICE

RELATED U.S. APPLICATION

This application is a continuation of and claims priority to U.S. patent Ser. No. 09/709,142 entitled "Pixel Border For Improved Viewability Of A Display Device," by Canova et al., filed on Nov. 8, 2000 now U.S. Pat. No. 6,961,029, which is incorporated herein by reference.

BACKGROUND OF THE INVENTION

1. Field of the Invention

The present invention relates to the field of display screen technology. More specifically, embodiments of the present invention relate to flat panel display screens that are useful in conjunction with portable electronic devices.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs). Many PDAs have a small and flat display screen associated therewith.

In addition to PDAs, small flat display screens have also been implemented within other portable electronic devices, such as cell phones, electronic pagers, remote control devices and other wireless portable devices.

Liquid crystal display (LCD) technology, as well as other flat panel display technologies, have been used to implement many of the small flat display screens used in portable electronic devices. These display screens contain a matrix of pixels, with each pixel containing subpixels for color displays. Some of the displays, e.g., color displays, use a back lighting element for projecting light through an LCD matrix. Other displays, e.g., black and white, use light reflectivity to create images through the LCD matrix and these displays do not need back lighting elements when used in lit surroundings. Whether color or in black and white, because the displays used in portable electronic devices are relatively small in area, every pixel is typically needed and used by the operating system in order to create displays and present information to the user. Additionally, because the display device is typically integrated together with the other elements of the portable electronic device, the operating systems of the portable electronic devices typically expect the display unit to have a standard pixel dimension, e.g., an (m×n) array of pixels.

FIG. 1A illustrates a typical black and white display screen having a standard size pixel matrix 20 with an exemplary edge-displayed character thereon. The edge-displayed character is the letter "A" and is displayed at the left hand side of the display screen at an arbitrary height. The technology could be either transmissive or reflective liquid crystal display (LCD). In the black and white display screen, the background pixels 26 are typically light, e.g., not very dark, and the pixels 24 that make up the edge-displayed character are typically dark. The edge location 28 of the display screen, e.g., between the edge of the matrix 20 and the bezel 22 of the portable electronic device, is typically the same color as the background pixels 26. Therefore, the left edge of the edge-displayed character, "A," has good contrast and is therefore easily viewed by the user. This is the case regardless of the particular edge used, e.g., left, right, up, down, because region 28 surrounds the matrix 20.

FIG. 1B illustrates a typical color display screen having a pixel matrix 20' with the same edge-displayed character thereon. The display screen could be an LCD having thin film transistor (TFT) technology. The edge-displayed character is the letter "A" and is displayed at the left hand side of the display screen at an arbitrary height. In this format, the background pixels 26 are typically light, e.g., because of the back lighting element, and the pixels 24 that make up the edge-displayed character are typically dark. However, importantly, the edge location 28 of the display screen, e.g., between the edge of the color matrix 20' and the bezel 22 of the portable electronic device, is typically dark. Being dark, the edge region 28 is the same or similar color as the pixels 24 that make up the character. Therefore, the left edge of the edge-displayed character, "A," has very poor contrast and is therefore typically lost as illustrated in FIG. 1B. This makes reading the edge displayed character very difficult for a user. This is the case regardless of the particular edge used, e.g., left, right, up, down, because region 28 surrounds the color matrix 20'.

In an attempt to address this problem, some computer systems do not display edge-located characters to avoid the contrast problems associated with the screen edge. Many desktop computer systems, for example, simply try to avoid the display of edge-located characters on the cathode ray tube (CRT) screen or on a large flat panel display. However, this solution is not acceptable in the case of a small display screen where every pixel is needed for image and information presentation. What is needed is a display that makes maximal use of the available screen pixels while eliminating the problems associated with edge displayed characters in any display format where the pixels of the character are of the same or similar color as the edge region 28. What is also needed is a solution that is also compatible with standard display screen dimensions and formats.

SUMMARY OF THE INVENTION

Accordingly, embodiments of the present invention provide an electronic device, e.g., a cell phone, PDA, electronic pager, etc., having a screen that makes maximal use of the available screen pixels while eliminating the problems associated with edge displayed characters in any display format where the pixels of the character are of the same or similar color as the edge region. Embodiments provide the above benefits while being compatible with standard display screen sizes and formats. Embodiments of the present invention therefore provide a small display screen with improve viewability, especially at the edge locations. The present invention provides these advantages and others not specifically mentioned above but described in the sections to follow.

A display device is described herein having a display matrix including a pixel border of width x and located around the edge locations of the display matrix for improved viewability. In particular, the border can be several pixels wide, e.g., 1<x<5. In one embodiment, the border is two pixels wide and surrounds a liquid crystal display (LCD) matrix area in which images are generated from a frame buffer memory. In one embodiment, the pixels of the border are "dummy pixels" each containing a red, a green and a blue subpixel. Each subpixel has a respective color filter and is manufactured with a "dummy" transistor which operates to fix open the subpixels thereby allowing a predetermined amount of "white" color brightness through the dummy pixels. In one implementation, the brightness amount is approximately 80-95 percent of the saturation brightness for the display screen.

The pixel border is useful for increasing viewability of characters that are displayed along the edge of the LCD matrix area in which images are generated from a frame buffer memory. The pixel border is particularly useful for these edge displayed characters when the background color is of a particular color or shade and the characters are generated using pixels of that same particular color or shade. The pixel border is also advantageous in that it can be used without requiring any changes in the character generation processes of the operating system of the computer used to drive the display screen. In this way, the display advantages of the present invention are compatible with standard circuitry for driving standard displays. In one embodiment, the novel display can be used within a portable computer system or other portable electronic device.

More specifically, an embodiment of the present invention includes a portable electronic device comprising: a processor coupled to a bus; a memory unit coupled to the bus; a user input device coupled to the bus; and a display unit coupled to the bus and comprising: a matrix of independently controllable pixels comprising m rows and n columns of discrete pixels, the matrix for generating an image therein by light modulation and wherein the image is representative of information stored in a frame buffer memory; and a pixel border having a predetermined width, the pixel border surrounding the matrix of independently controllable discrete pixels and comprising dummy pixels, wherein each dummy pixel is analogous to a pixel of the matrix but without containing an active transistor. Embodiments include the above and further comprising a back lighting element for illuminating the matrix and the pixel border.

Embodiments include the portable electronic device as described above and wherein each pixel of the matrix comprises: a red subpixel having a first active transistor; a green subpixel having a second active transistor; and a blue subpixel having a third active transistor and wherein each dummy pixel of the matrix comprises: a red sub-dummy-pixel; a green sub-dummy-pixel; and a blue sub-dummy-pixel.

Embodiments include the portable electronic device as described above wherein the matrix is fabricated using thin film transistor liquid crystal display technology.

BRIEF DESCRIPTION OF THE DRAWINGS

FIG. 2C is another exemplary computer system embodiment

DETAILED DESCRIPTION OF THE INVENTION

In the following detailed description of the present invention, a display matrix having a pixel border of dummy pixels for providing contrast improvement for increased viewability of edge-displayed characters, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Portable Electronic Device Platform

Figure 1A:
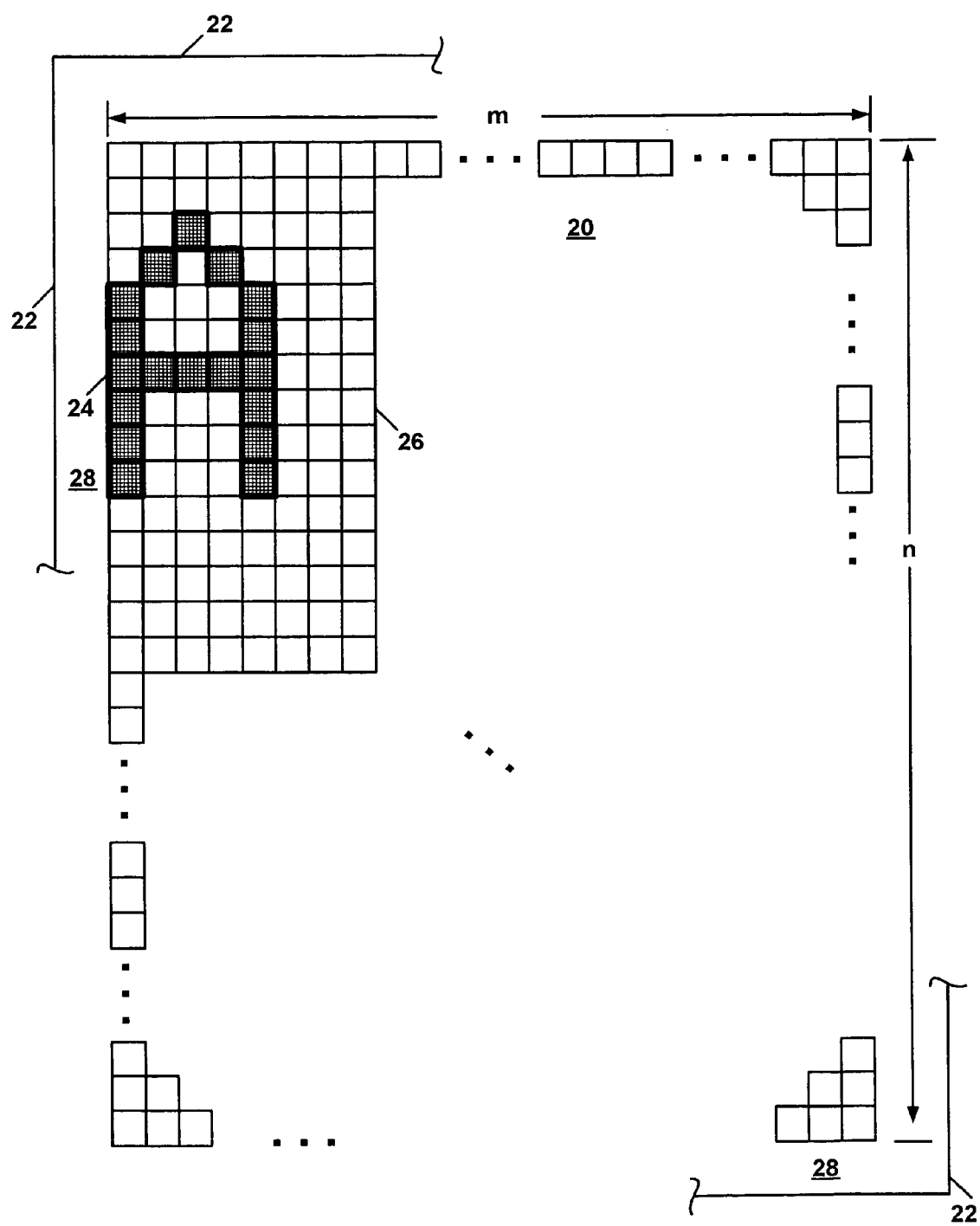
FIG. 1A illustrates a display screen of the prior art having an edge displayed character where the background pixels are light and the character is composed of darker pixels.
Figure 1B:
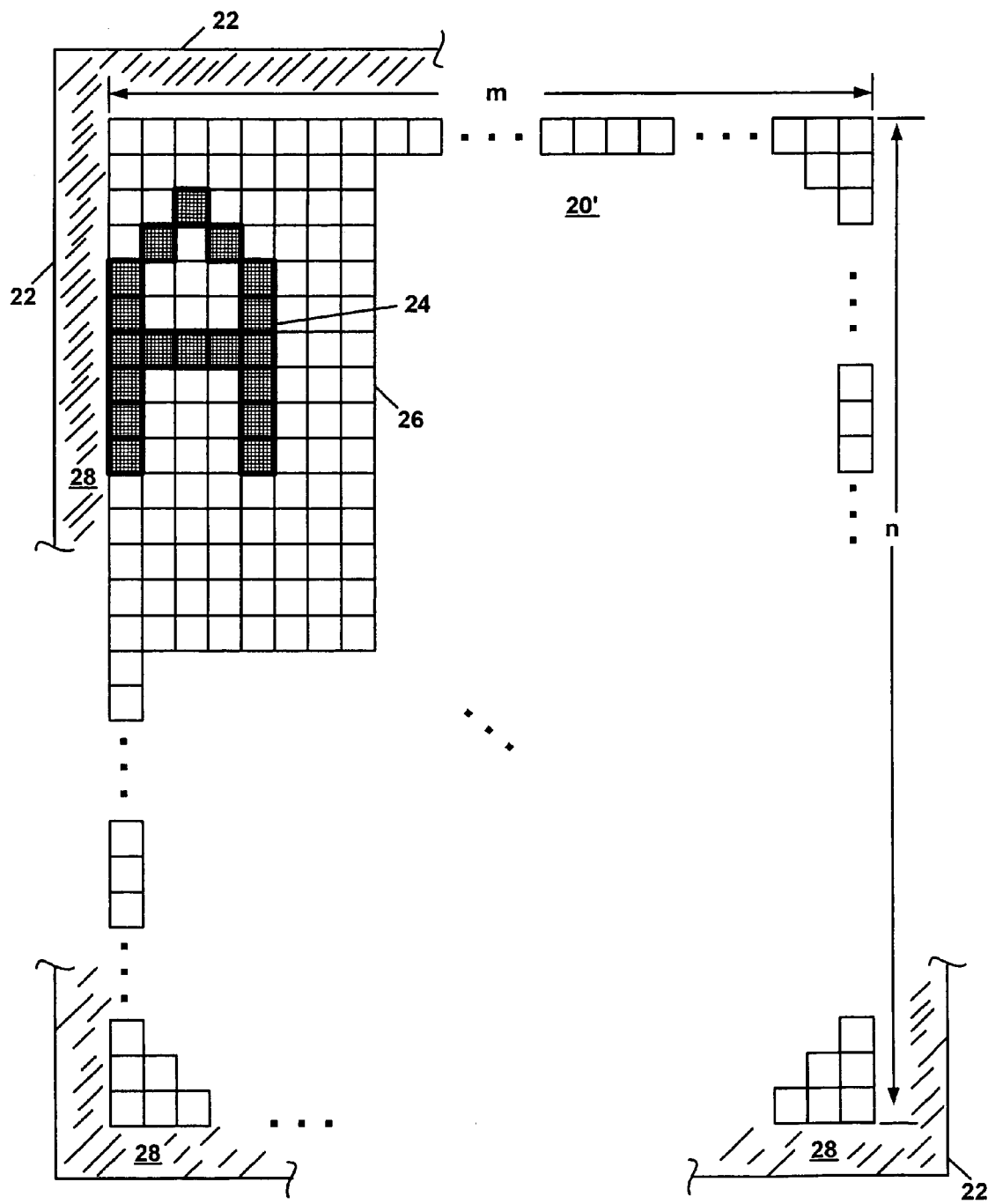
FIG. 1B illustrates a display screen of the prior art having an edge displayed character in a video format where the pixels of the character are of the same or similar color and shade as the edge region of the display panel.
Figure 2A:
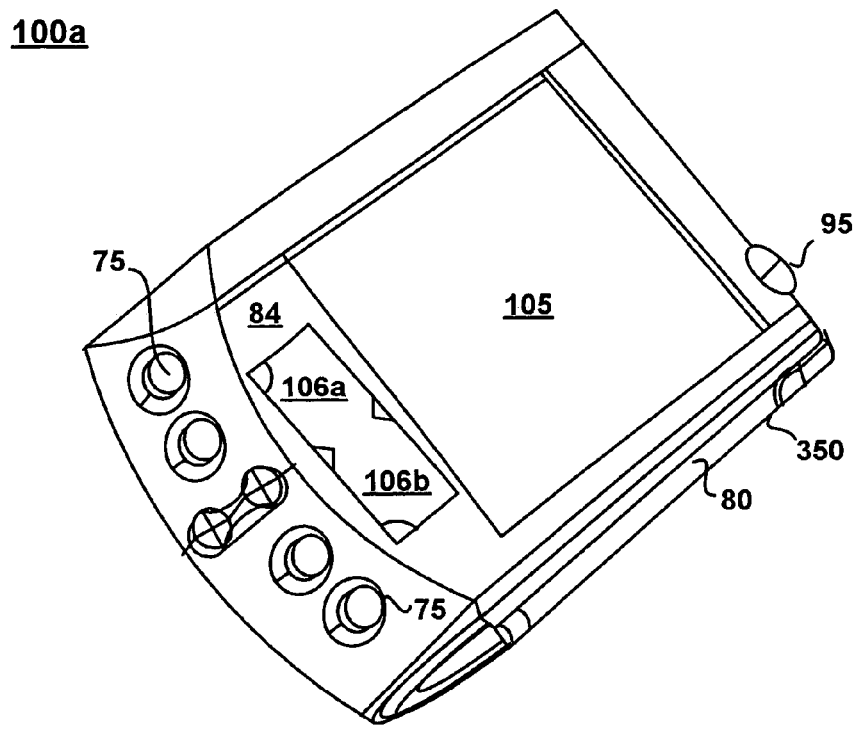
FIG. 2A is a top side perspective view of an exemplary palmtop computer system that can be used in one embodiment of the present invention.

Although the display screen of the present invention can be implemented in a variety of different electronic systems such as a pager, a cell phone, a remote control device, etc., one exemplary embodiment includes the integration of the display screen with a portable electronic device. FIG. 2A is a perspective illustration of the top face 100a of one embodiment of a palmtop computer system that can be used in implementation of the present invention. The top face 100a contains the novel display screen 105 surrounded by a bezel or cover. A removable stylus 80 is also shown. The novel display screen 105 contains a transparent touch screen (digitizer) able to register contact between the screen and the tip of the stylus 80. The novel display screen 105 is described in more detail further below. The stylus 80 can be of any material to make contact with the screen 105. As shown in FIG. 2A, the stylus 80 is inserted into a receiving slot or rail 350. Slot or rail 350 acts to hold the stylus when the computer system is not in use. Slot or rail 350 may contain switching devices for automatically powering down and automatically powering up computer system based on the position of the stylus 80. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
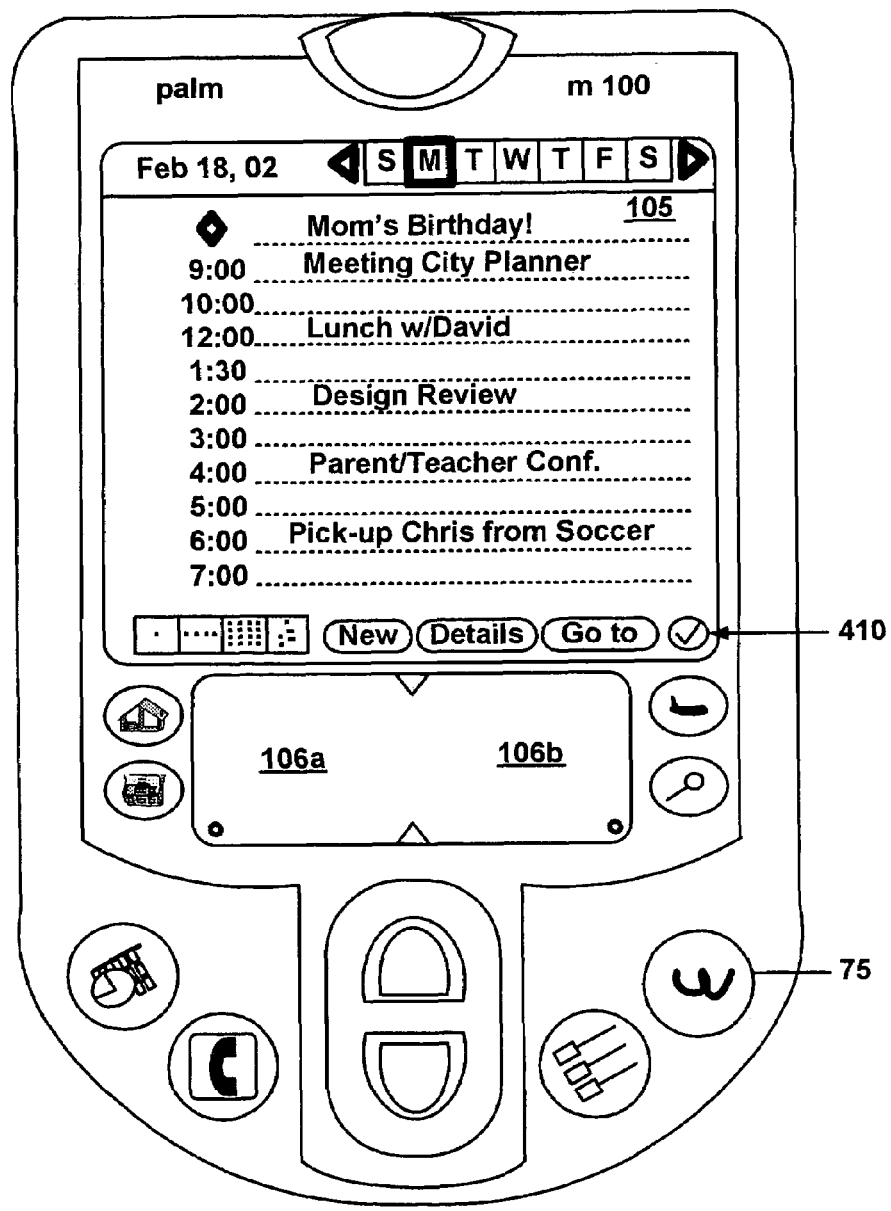
FIG. 5 is a front view of the exemplary computer system that can be used within the display screen of the present invention.

The digitizer 160 records both the (x, y) coordinate value of the current location of the stylus and also simultaneously records the pressure that the stylus exerts on the face of the digitizer pad. The coordinate values (spatial information) pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
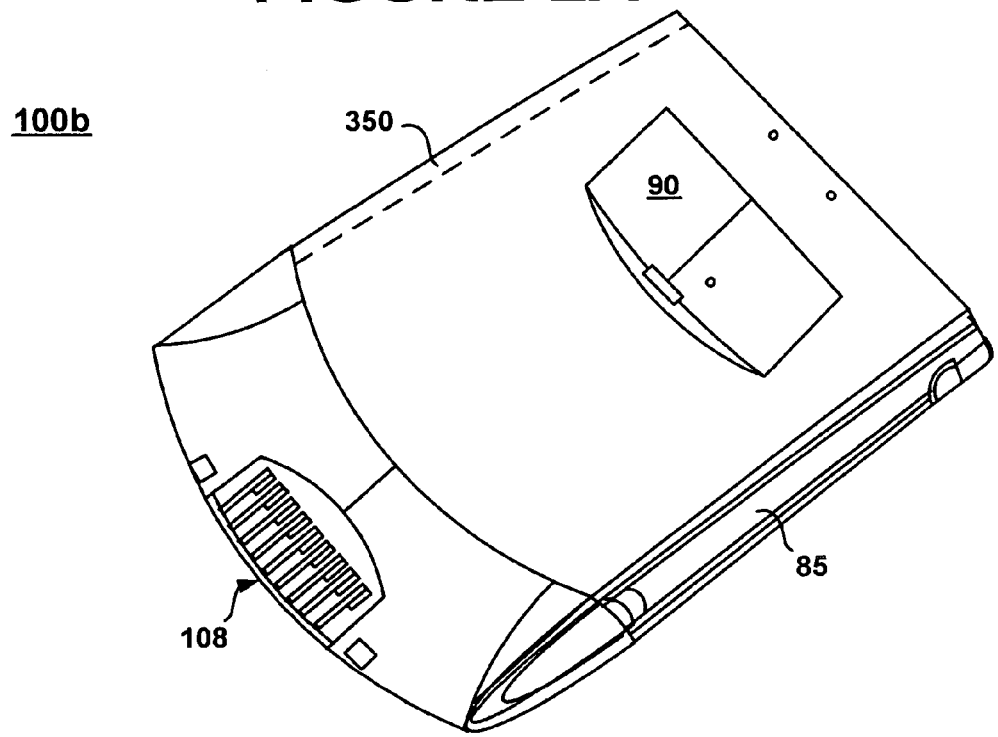
FIG. 2B is a bottom side perspective view of the exemplary palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

FIG. 2C illustrates a front perspective view of another implementation of the palmtop computer system 100c. As shown, the flat central area is composed of the novel display screen area 105 and a thin silk screen layer material portion 84. Typically, the silk screen layer material portion 84 is opaque and may contain icons, buttons, images, etc., graphically printed thereon in addition to regions 106a 106b. The novel display screen area 105 and portion 84 are disposed over a digitizer.

Figure 3:
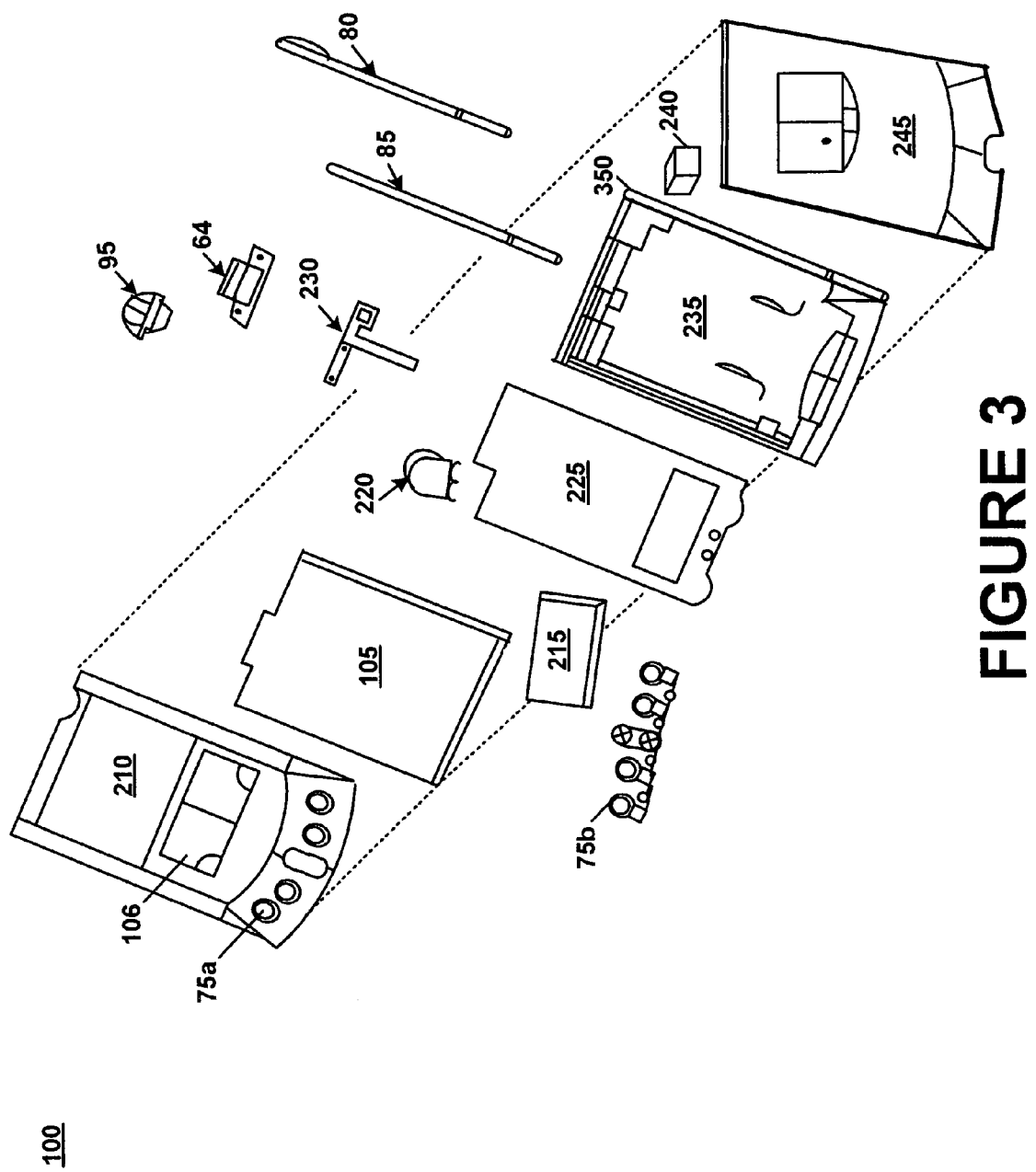
FIG. 3 is an exploded view of the components of the exemplary palmtop computer system of FIG. 2A and FIG. 2C.

FIG. 3 is an exploded view of the exemplary palmtop computer system 100 in accordance with one implementation of the present invention. System 100 contains a front cover 210 having an outline of region 106 and holes 75a for receiving buttons 75b. The novel flat panel display 105 (both liquid crystal display and touch screen in one embodiment) fits into front cover 210. Any of a number of display technologies can be used, e.g., LCD, FED, plasma, etc., for the flat panel display 105 and having the further details as described below. In one embodiment, the display 105 is a flat panel multi-mode display capable of both monochrome and color display modes.

The touch screen can be a digitizer. A battery 215 provides electrical power. Replaceable cells or rechargeable batteries can be used. Well known electronics coupled to the battery 215 can detect the energy level of the battery 215. This information can be sampled by the computer system 110 (FIG. 5) using well known techniques. The digitizer of FIG. 3 can be implemented using well known devices, for instance, using the ADS-7846 device by Burr-Brown that provides separate channels for spatial stroke information and pressure information. An optional contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown. The midframe 235 contains the stylus receiving slot or rail 350.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
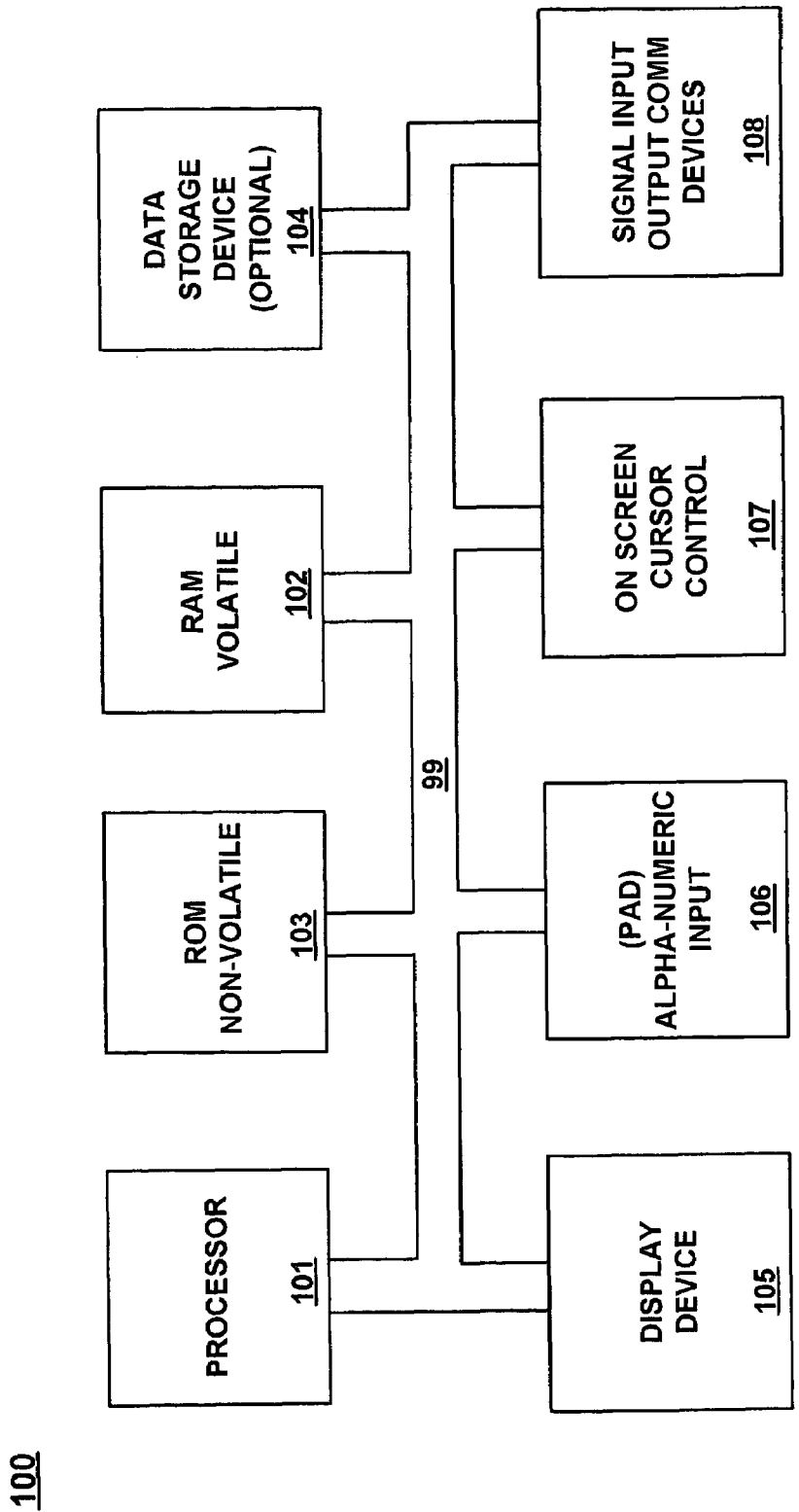
FIG. 4 is a logical block diagram of the exemplary palmtop computer system in accordance with an embodiment of the present invention.

FIG. 4 illustrates circuitry of computer system 100, some of which can be implemented on PC board 225. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains the novel display device 105 in accordance with the present invention which is coupled to the bus 99 for displaying information to the computer user. PC board 225 can contain the processor 101, the bus 99, the ROM 103 and the RAM 102.

Also included in computer system 100 of FIG. 4 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional-cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 is described in more detail below and may be a liquid crystal device, cathode ray tube (CRT), field emission device (FED, also called flat panel CRT) or other display device suitable for creating graphic images and alphanumeric characters recognizable to the user.

Signal communication device 108, also coupled to bus 99, can be a serial port for communicating with the cradle 60. Device 108 can also include an infrared communication port.

FIG. 5 is a front view of the exemplary palmtop computer system 100 having an exemplary display within screen 105. The exemplary display contains one or more graphical user-interface elements including a menu bar and selectable on-screen buttons 410. Buttons on screen 105 can be selected by the user directly tapping on the screen location of the button with stylus 80 as is well known. Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the device is also operable within a single region that recognizes both alphabetic and numeric characters.

It is appreciated that, in one embodiment, the digitizer region 106a and 106b are separate from the display screen 105 and therefore does not consume any display area.

Figure 6A:
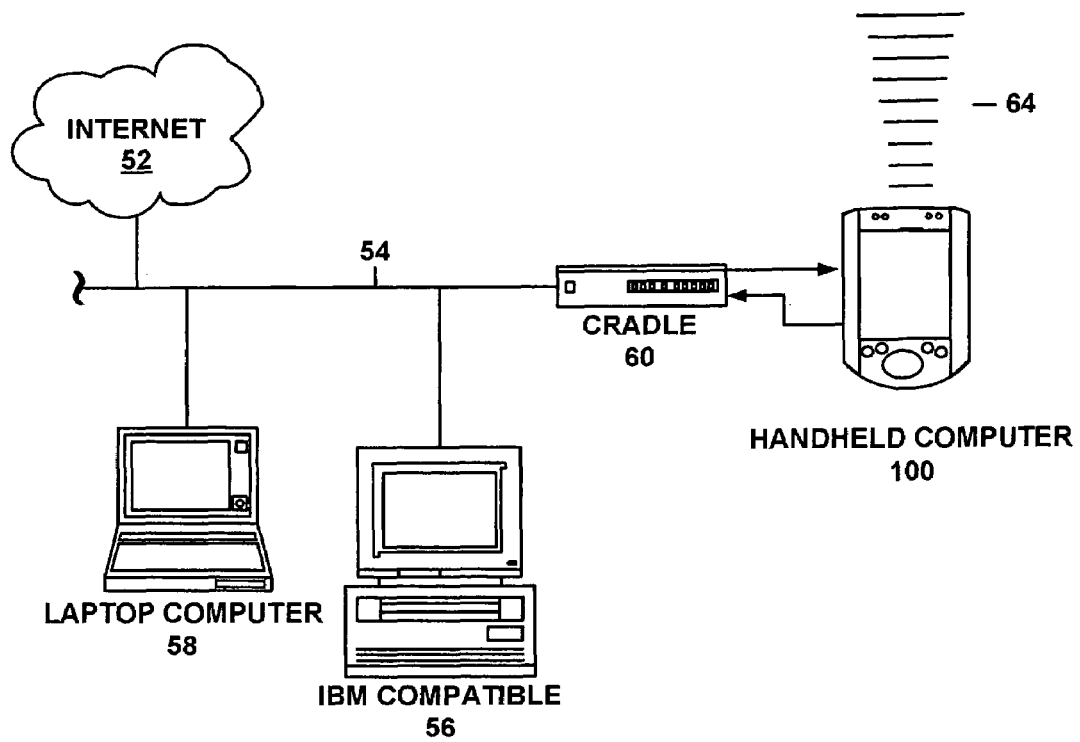
FIG. 6A is an exemplary communication network in which the exemplary palmtop computer can be used.

FIG. 6A illustrates a communication system 50 that can be used in conjunction with the palmtop computer system 100. System 50 is exemplary and comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 6B:
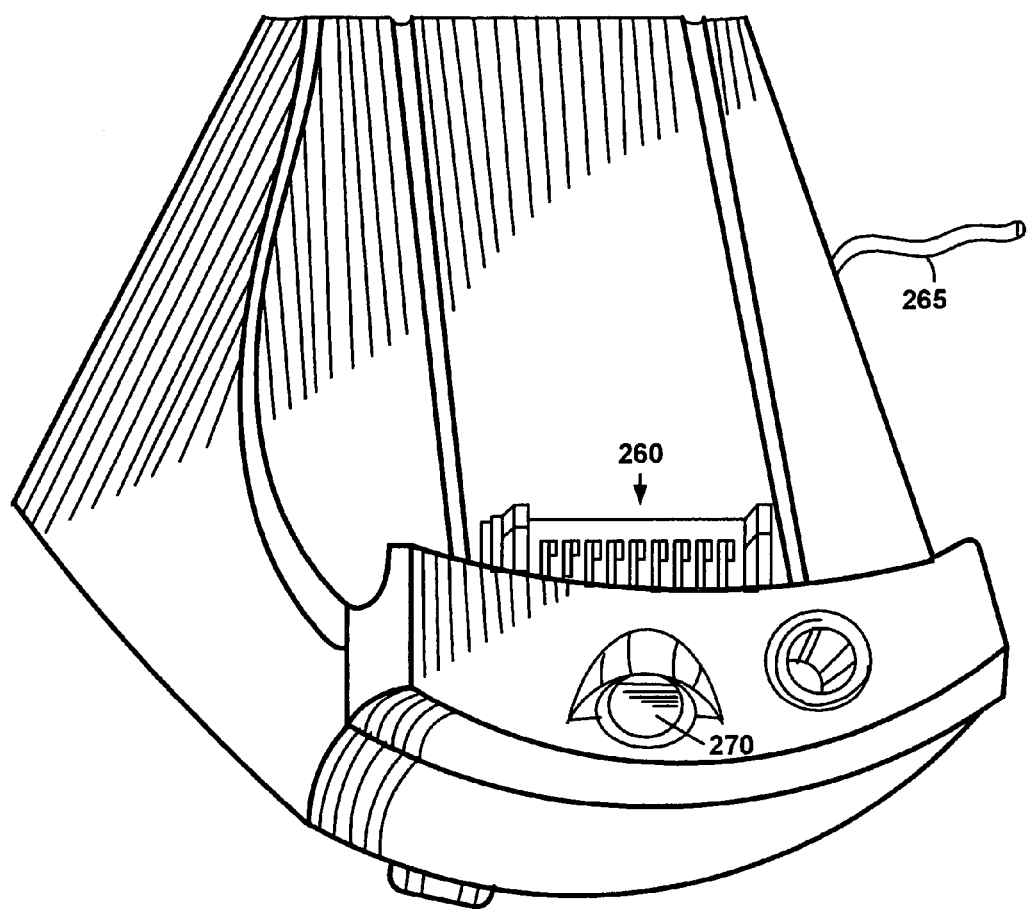
FIG. 6B is a perspective view of a cradle device for connecting the exemplary palmtop computer system to other systems via a communication interface.

FIG. 6B is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Pixel Border of the Present Invention

Figure 7:
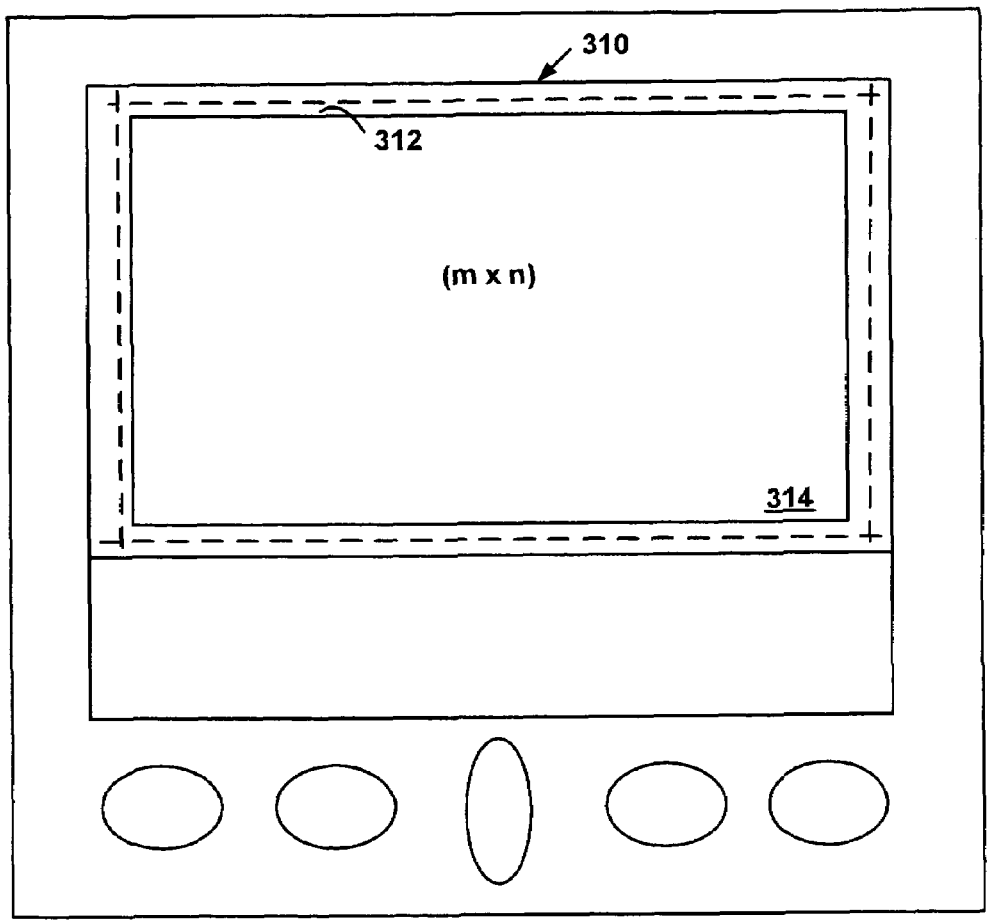
FIG. 7 illustrates a display screen in accordance with one embodiment of the present invention including a border pixel region and a frame buffer pixel region.

FIG. 7 illustrates a front view of the display screen in accordance with an embodiment of the present invention. The display screen contains two different display regions. Region 314 is the frame buffer pixel region and contains a matrix of pixels oriented in m rows and n columns according to a variety of display dimensions and formats. Region 314 generates an image that is a representation of data stored in a frame buffer memory (also called video memory) of computer system 100. Although region 314 can have any dimensions, in one embodiment it includes the dimensions of 160 pixels by 160 pixels. The computer system, e.g., the operating system, controls the information that is stored into the frame buffer memory and thereby controls the pixels of region 314.

Surrounding region 314 of FIG. 7 is a novel pixel border region 312 in accordance with the present invention and having a predetermined pixel width, x. The pixels of the pixel border region 312 are called "dummy" pixels because they do not have a controllable element therein. Although the width is arbitrary, in one embodiment the width is two pixels. The pixel border region 312 of the present invention is not controlled by the frame buffer memory and is useful for giving contrast improvement for the viewability of edge located characters. In this respect, the pixels of the pixel border 312 are generally displayed white to match the background pixel color. Specifically, the pixel border 312 is useful for giving contrast improvement for characters displayed along the edges, e.g., upper, lower, right and left, of region 314. The total viewing, area (in pixels) of the display screen when x=2 is therefore m+4 rows and n+4 columns.

Figure 8:
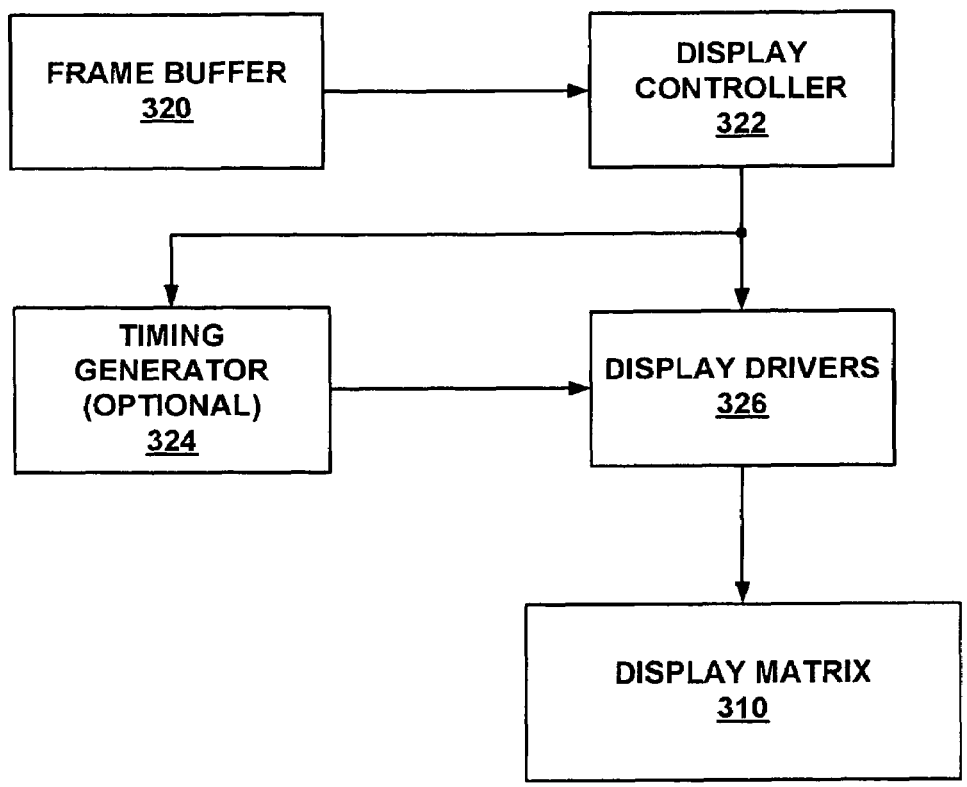
FIG. 8 is a block diagram of the display unit in accordance with one embodiment of the present invention.

FIG. 8 illustrates a logical diagram of the components of the novel display unit 105 in accordance with an embodiment of the present invention. Frame buffer memory 320 contains a bitmapped image for display. This frame buffer is read, periodically, by a display controller 322. The display controller 322 is well known. Display controller 322 is either coupled directly to a display driver 326 or to a timing generator 324. Controller 322 generates well known timing signals, such as vertical and horizontal synchronization signals, as well as clocking signals; all required to properly propagate image data into the display drivers 326. The timing generator 324 is sometimes needed to convert the signals from the controller according to the requirements of the drivers. The display drivers 326 are coupled to active transistors within the display matrix 310. The display matrix 310 generates images by the modulation of light by discrete pixel elements. The display matrix 310 can be of liquid crystal display (LCD) technology but could also be of any active display technology, such as field emission display (FED) technology or other flat panel display technologies. Although display matrix 310 is coupled to display drivers 326, it is appreciated that region 312 is not coupled to display drivers because it contains no active elements.

Figure 9A:
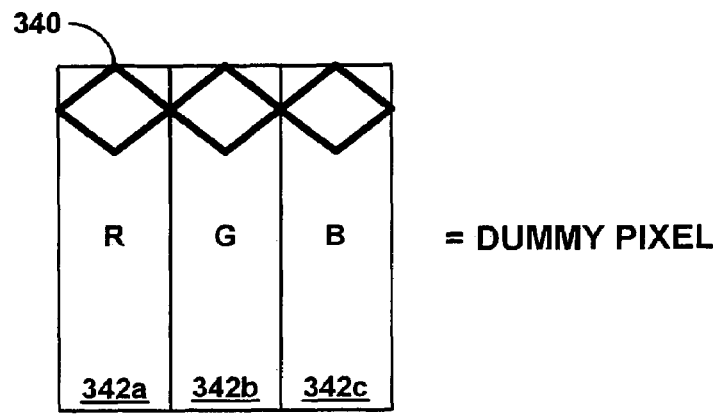
FIG. 9A is a diagram of a dummy pixel of the border pixel region in accordance with an embodiment of the present invention.

FIG. 9A illustrates an example dummy pixel 312i of the pixel border region 312 of the present invention. In one embodiment, the display matrix 310 is an LCD device constructed using thin film transistor (TFT) technology. The dummy pixel is like a conventional pixel of the frame buffer pixel region 314 except the dummy pixel 312i does not contain an active element, as indicated by the darkened diamond 340. The active element can be any number of display elements, including a transistor, a series of diodes or a single diode. Therefore, the dummy pixels are not controlled by the frame buffer memory and are not coupled electrically to the display driver circuits 326 (FIG. 8). In one embodiment, the display is a color display and therefore the dummy pixel 312i is comprised of three sub-dummy-pixels including a red sub-dummy-pixel 342a, a green sub-dummy-pixel 342b and a blue sub-dummy-pixel 342c. Each sub-dummy-pixel 342a-342c contains a respective color filter. It is appreciated that by not containing an active transistor therein, each of the sub-dummy-pixels 342a-342c of the dummy pixel 312i remain fixed and open thereby allowing light to pass there through creating a white image for the dummy pixel 312*i*. Each sub-dummy-pixel contains a respective color filter.

Figure 9B:
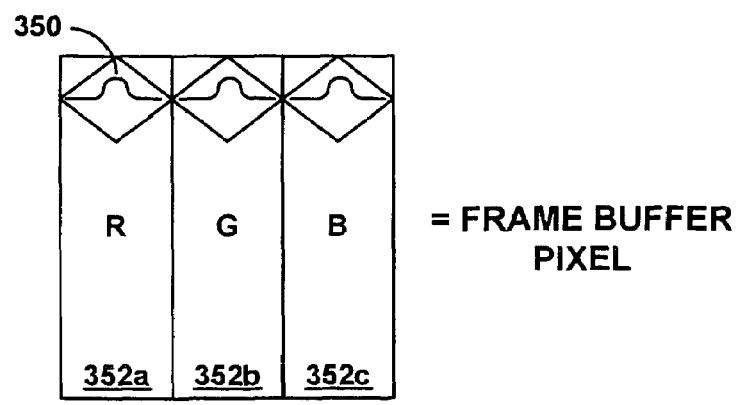
FIG. 9B is a diagram of an active pixel of the frame buffer pixel region in accordance with an embodiment of the present invention.

FIG. 9B illustrates a pixel 3141 of the frame buffer pixel region 314. In one embodiment, the display is color and therefore pixel 3141 contains a red subpixel 352*a*, a green subpixel 352*b* and a blue subpixel 352*c*. Each subpixel contains a respective active element 350, e.g., transistor, that is controlled by the frame buffer memory, e.g., each transistor 350 is coupled to the display driver circuits 326 (FIG. 8). Like the sub-dummy-pixels 342, each subpixel 352 also contains a respective color filter.

Figure 10:
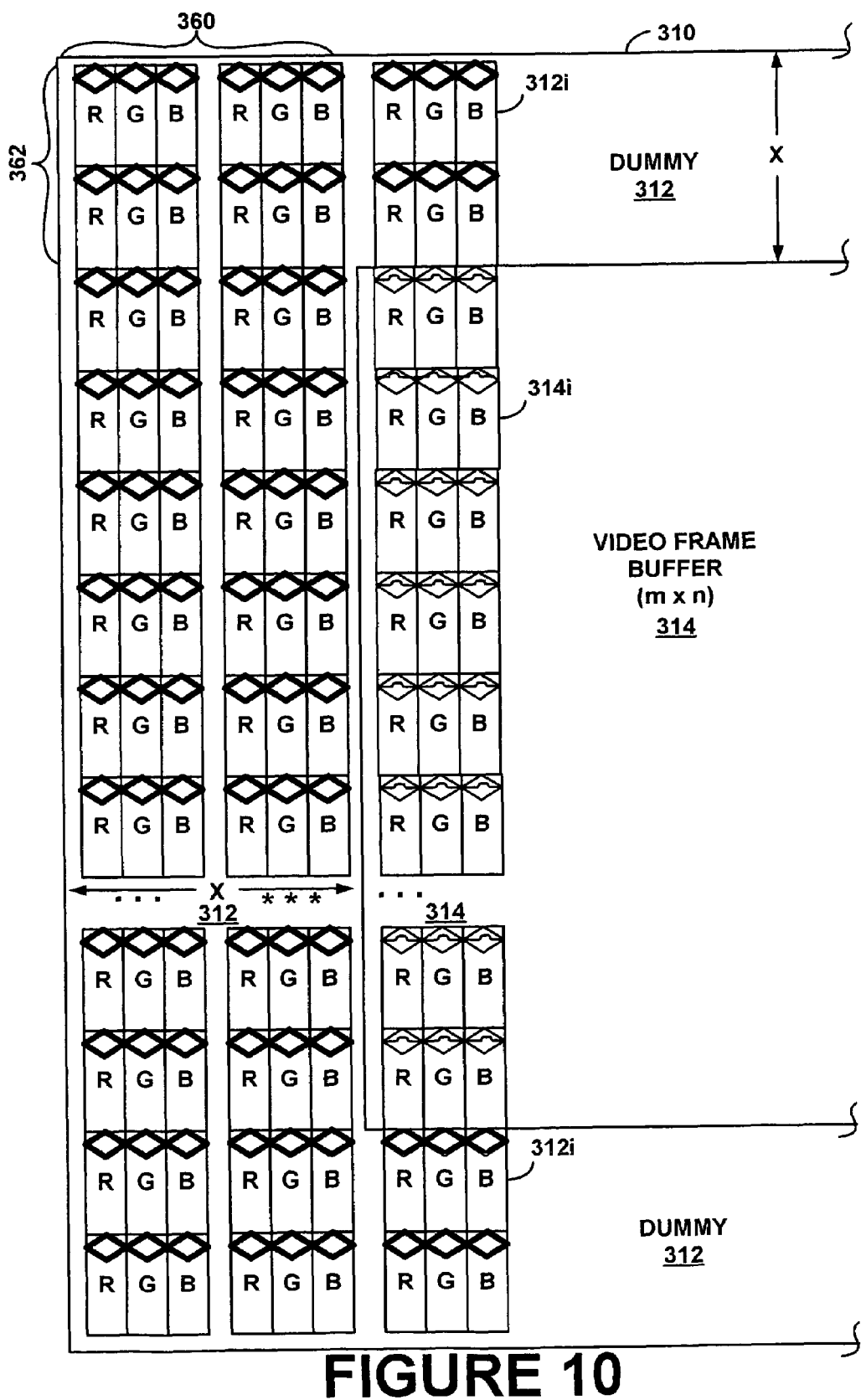
FIG. 10 illustrates the pixel architecture of the display matrix of one embodiment of the present invention including the border pixel region and the frame buffer pixel region.

FIG. 10 illustrates an exemplary pixel architecture of the display matrix 310 in accordance with an embodiment of the present invention where x=2 and the display is color. In this embodiment, the left hand side of the pixel border 312 is shown partially with the upper and lower corners displayed. As shown in FIG. 9A, dummy transistors are darkened. Two columns of dummy pixels are shown 360 along the left side edge. On the top edge, two rows of dummy pixels 362 are also shown and also on the bottom. The dummy pixels 312*i* of the border region 312 surround the frame buffer display region 314, which contains an array of m rows and n columns of pixels, some of which are shown as 314*i*. In one embodiment, there are 160×160 pixels in region 314 and the width of region 312 is two. In this case, the LCD glass has a color filter pattern of 164×164 pixels which allow light through from a back light element (FIG. 11). The LCD glass has transistors placed on only the interior 160×160 pixels (region 314) which are addressed by the frame buffer memory. In this case, the pixel border 312 remains lit all the time thereby providing a white border.

Figure 11A:
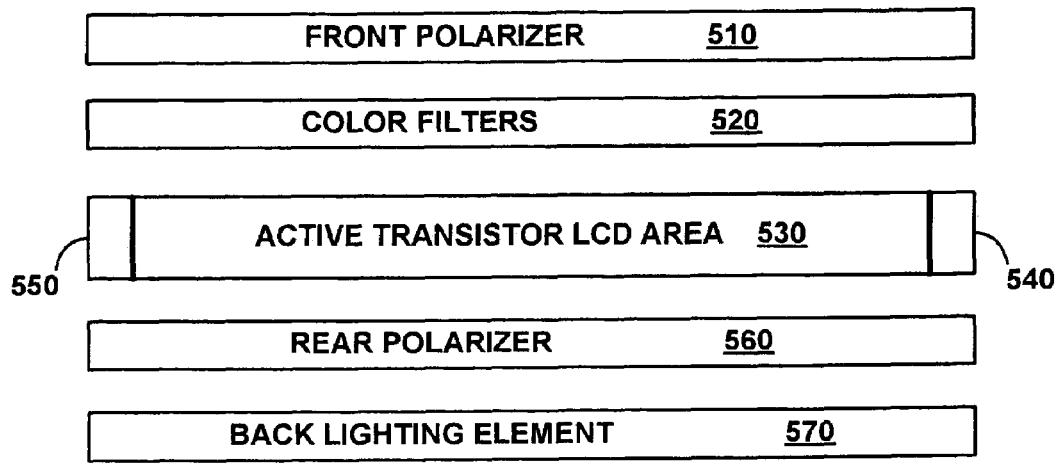
FIG. 11A is a cross sectional view of the display matrix including a cross sectional view of the pixel border in accordance with an embodiment of the present invention.

FIG. 11A illustrates a cross section of the display matrix 310 in accordance with one embodiment of the present invention. The embodiments of the present invention can be applied to transmissive, transreflective and reflective display technologies. In this embodiment, a backlighting element 570, e.g., a cold cathode fluorescent (CCF) tube or other lighting device, is illustrated adjacent to a rear polarizer layer 560. An active transistor LCD layer 530 is also shown. The active transistor layer 530 maps to region 314 and may control m rows and n columns of pixels. Region 540 and region 550 correspond to the dummy pixel border 312 and therefore do not contain any transistors thereby always allowing light to pass there through. A color filter pattern 520 is also shown. The color filter pattern 520 is a matrix of (m+2x) by (n+2x) pixels. After the color filter pattern 520, a front polarizer layer 510 is provided.

Figure 11B:
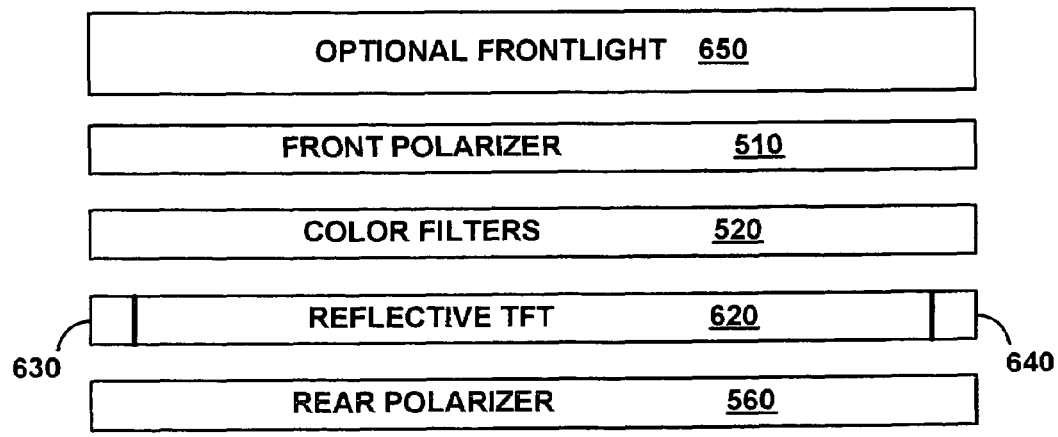
FIG. 11B is a cross sectional view of a reflective display matrix including a cross sectional view of the pixel border in accordance with an embodiment of the present invention.

FIG. 11B illustrates a cross section of a reflective display matrix 610 in accordance with one embodiment of the present invention. In this embodiment, a reflective thin film transistor layer 620 is used. Layer 620 maps to region 314 and may control m rows and n columns of pixels. Region 640 and region 630 correspond to the dummy pixel border 312 and therefore do not contain any transistors thereby always allowing light to pass through. An optional frontlight layer 650 can be used and a front polarizer 510 is shown along with a rear polarizer 560. The color filter pattern 520 is a matrix of (m+2x) by (n+2x) pixels.

Figure 12:
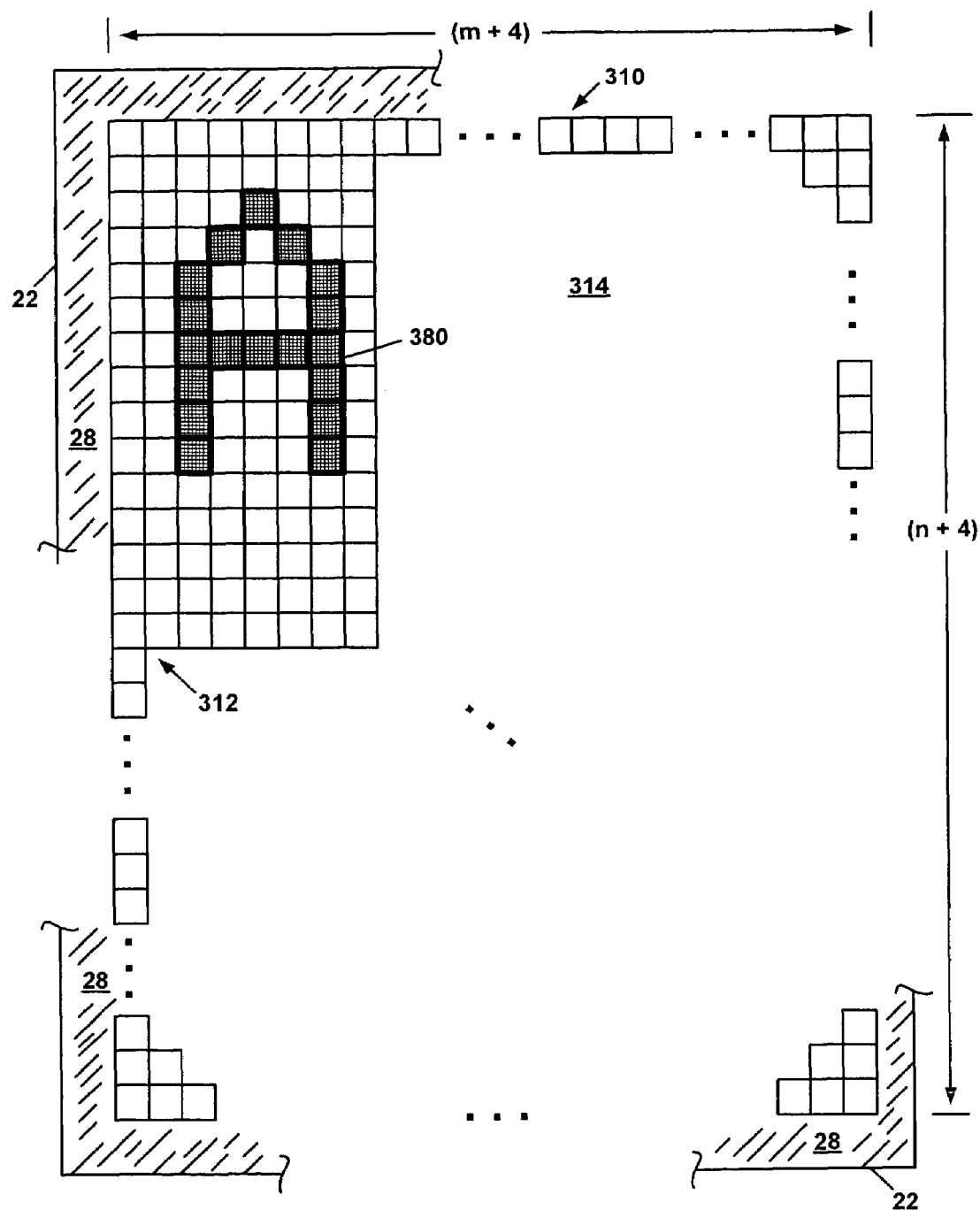
FIG. 12 is an exemplary display using the display unit with pixel border in accordance with one embodiment of the present invention and having an edge displayed character in a video format in which the character pixels are of the same or similar color as the edge of the display panel.

FIG. 12 illustrates a resultant display in accordance with the present invention using a pixel border of width=2. The pixels 380 of the edge displayed character, "A," are dark and the background pixels are white in this case, e.g., one exemplary form of a reverse video display format. The edge region 28 of the display panel is dark, e.g., the same or similar color as the pixels 380 of the character. In this exemplary case, the border pixels 312 of the present invention are also white. The total number of pixels in the display 310 are (m+2x) by (n+2x). By providing a white border region 312, the contrast along the left edge of the character, "A," is much improved thereby improving viewability of the character. This advantageous result is achieved without any requirement of changing the operating system of the computer because the standard (m×n) pixel region 314 of the display remains unchanged. Furthermore, because the border pixels (dummy pixels) of region 312 are not driven by driver circuitry, standard (m×n) driver circuits and software can be used with the present invention.

The preferred embodiment of the present invention, a display matrix having a pixel border of dummy pixels for providing contrast improvement for increased viewability of edge-displayed characters, is thus described. While the present invention has been described in particular embodiments, it should be appreciated that the present invention should not be construed as limited by such embodiments, but rather construed according to the below claims.

What is claimed is:

1. A display unit comprising:
   a matrix of independently controllable pixels comprising m rows and n columns of discrete pixels, said matrix for generating an image therein by light modulation and wherein said image is representative of information stored in a frame buffer memory; and
   a pixel border having a predetermined width, wherein said predetermined width is two pixels, said pixel border surrounding said matrix of independently controllable discrete pixels and comprising dummy pixels, wherein each dummy pixel is analogous to a pixel of said matrix but without containing an active element and that remain fixed and open to always let light through.

2. A display unit as described in claim 1 and further comprising a back lighting element for illuminating said matrix and said pixel border.

3. A display unit as described in claim 2 wherein each pixel of said matrix comprises:
   a red subpixel having a first active element;
   a green subpixel having a second active element; and
   a blue subpixel having a third active element.

4. A display unit as described in claim 3 wherein each dummy pixel of said matrix comprises:
   a red sub-dummy-pixel;
   a green sub-dummy-pixel; and
   a blue sub-dummy-pixel.

5. A display unit as described in claim 1 wherein said matrix comprises 160 rows and 160 columns of discrete pixels.

6. A display unit as described in claim 1 wherein said matrix is fabricated using thin film transistor liquid crystal display technology.

7. A portable electronic device comprising:
   a processor coupled to a bus;
   a memory unit coupled to said bus;
   a user input device coupled to said bus; and
   a display unit coupled to said bus and comprising:
      a matrix of independently controllable pixels comprising m rows and n columns of discrete pixels, said matrix for generating an image therein by light modulation and wherein said image is representative of information stored in a frame buffer memory; and
      a pixel border having a predetermined width, wherein said predetermined width is two pixels, said pixel border surrounding said matrix of independently controllable discrete pixels and comprising dummy pixels, wherein each dummy pixel is analogous to a pixel of said matrix but without containing an active element and that remain fixed and open to always let light through.

8. A portable electronic device as described in claim 7 further comprising a back lighting element for illuminating said matrix and said pixel border.

9. A portable electronic device as described in claim 8 wherein each pixel of said matrix comprises:
- a red subpixel having a first active element;
- a green subpixel having a second active element; and
- a blue subpixel having a third active element.

10. A portable electronic device as described in claim 9 wherein each dummy pixel of said matrix comprises:
- a red sub-dummy-pixel;
- a green subdummy-pixel; and
- a blue sub-dummy-pixel.

11. A portable electronic device as described in claim 7 wherein said matrix comprises 160 rows and 160 columns of discrete pixels.

12. A portable electronic device as described in claim 7 wherein said matrix is fabricated using thin film transistor liquid crystal display technology.

13. A display unit comprising:
- a matrix of independently controllable pixels comprising m rows and n columns of discrete pixels, said matrix for generating an image therein by light modulation and wherein said image is representative of information stored in a frame buffer memory and wherein each pixel of said matrix comprises a respective active element and respective filter elements;
- a pixel border having a predetermined width, wherein said predetermined width is two pixels, said pixel border surrounding said matrix of independently controllable discrete pixels and comprising dummy pixels that remain fixed and open to always let light through, wherein each dummy pixel comprises respective filter elements without an active element; and
- a back lighting element for illuminating said matrix and said pixel border.

14. A display unit as described in claim 13 wherein said respective filter elements of each pixel of said matrix comprise:
- a red filter;
- a green filter; and
- a blue filter.

15. A display unit as described in claim 14 wherein said respective filter elements of each dummy pixel of said matrix comprise:
- a red filter;
- a green filter; and
- a blue filter.

16. A display unit as described in claim 13 wherein said matrix comprises 160 rows and 160 columns of discrete pixels.

17. A display unit as described in claim 13 wherein said matrix is fabricated using thin film transistor liquid crystal display technology.

* * * * *